3,634,395
PREPARATION OF STARCH DERIVATIVES CONTAINING BOTH CARBOXYL AND CARBONYL GROUPS
Raoul Guillaume Philippe Walon, Brussels, Belgium, assignor to CPC International, Inc.
No Drawing. Filed Oct. 10, 1969, Ser. No. 865,507
Int. Cl. C08b *19/06*
U.S. Cl. 260—233.3 R        6 Claims

ABSTRACT OF THE DISCLOSURE

Starch derivatives containing both carbonyl and carboxyl groups are prepared by subjecting starch to the oxidizing action of a peroxide, e.g. hydrogen peroxide, in the presence of a catalyst comprising stabilized ferrous ions. Preferably, the stable ferrous catalyst is prepared by fixing the ferrous ions onto a strongly acid cation exchange resin.

---

This invention relates to a process for treating starch so as to introduce into the starch molecule both carbonyl and carboxyl groups in approximately equal amounts. Carbonyl-containing starches are known, dialdehyde starch being the best known example. In addition, U.S. Pat. No. 3,329,672, Hugh J. Roberts, which issued on July 4, 1967, discloses and claims carbonyl-containing starches, which are prepared by oxidizing a vic-glycol derivative of starch with periodic acid, salts thereof, or the like. Carboxyl-containing starches are also known. It is difficult, however, to obtain a starch which contains both carboxyl groups and a substantial number, approximately equal to that of the carboxyl groups, of carbonyl groups. Conventional oxidizing processes result in the formation of substantial amounts of carboxyl function, with little or no carbonyl function being present in the starch molecule.

Starch derivatives containing, in addition to the hydroxyl groups of the molecule, both carbonyl and carboxyl groups, find many uses. Because they show the characteristics of both carbonyl-containing and carboxyl-containing starches, they can be put to any of the end uses to which these materials are now employed, e.g. as paper and textile sizings and coatings, adhesives, etc. They are particularly useful as binders for paper coating colors and as textile sizings, especially for polyester-containing yarns. Furthermore, because they have three reactive sites, they are excellent starting materials for a large number of useful starch derivatives.

It is an object of the present invention to provide a process for selectively oxidizing starch so as to introduce both carboxyl and carbonyl groups into the molecule, in approximately equal quantities.

An additional object is to prepare starch derivatives containing both carboxyl groups and also a substantial number of carbonyl groups.

A further object is to prepare starch derivatives containing both carboxyl and carbonyl groups, which derivatives are extremely reactive and can be used as intermediates in the preparation of a number of useful compounds.

Other objects and advantages will appear from a reading of the specification and claims.

In accordance with my process, starch is oxidized with a peroxide, e.g. hydrogen peroxide, in the presence of a ferrous catalyst. The ferrous catalyst should be stabilized so as to prevent the ferrous ions from being oxidized to ferric ions by the hydrogen peroxide. A suitable and preferred method for accomplishing this is to fix the ferrous ions on a strongly acid cation exchange resin, which is resistant to oxidation.

Cation exchange resins which are suitable for use in the present invention are generally copolymers prepared by reacting styrene with varying amounts of divinyl benzene and then sulfonating the aromatic nuclei forming the polymer backbone. In addition to styrene, other suitable monovinyl aromatic compounds are alpha methyl styrene, chlorostyrene, vinyl toluene, vinyl naphthalene and homologues thereof, capable of copolymerizing.

In addition, suitable polyvinyl aromatic compounds such as divinyl toluene, divinyl xylene, divinyl naphthalene, and divinylethyl benzene can be substituted for the divinyl benzene.

Resins of this type are manufactured under the trade name Amberlite by Rohm & Haas or Dowex by Dow Chemical Company. Also useful in the present invention in place of the above resins are cation exchange resins obtained by condensing an aldehyde, a phenol and an organic sulfonic acid to give sulfonated polymeric resins. Other resins having the properties of the foregoing strongly acidic cation exchange resins can also be used in the present invention.

Preferred cation exchange resins are prepared by sulfonating polymeric resins derived by copolymerizing a monomer solution containing 10%–20% by weight of divinyl benzene and 80%–90% by weight of styrene. Most preferred resins have a divinyl content of 12%–20% by weight and a styrene content of 80%–88% by weight. This type of resin will be referred to hereinafter as a sulfonated polystyrene resin.

The resin, preferably in bead or granule form, is first put in the hydrogen cycle by regeneration with acid. It is then saturated with ferrous ions or a mixture of ferrous ions with other metallic ions, as by passing a solution of a suitable ferrous salt, e.g. ferrous sulfate, over the resin.

The resin, which is saturated with ferrous ions, is then added to an aqueous slurry of the starch. Preferably, in order to avoid oxidation of the ferrous ions to ferric, the water used in preparing the initial solution of the ferrous salt and that used in preparing the starch slurry should be boiled in order to remove dissolved oxygen.

A peroxide solution, preferably hydrogen peroxide, is then slowly added to the resulting mixture, preferably with mild agitation throughhout the entire process. The amount of peroxide added will depend upon the degree of substitution desired. Preferably at least about 5% peroxide is employed, based on the weight of the starch. It is desirable to maintain the temperature of the reaction mixture below about 60° C., and preferably not above about 30° C. It is possible to carry out the process at higher temperatures, e.g. at or above the gelatinization temperature of the starch in order to obtain a gelatinized product. However, high temperatures result in substantial yield losses due to the formation of solubles, and can also damage the catalyst. Therefore, a reaction temperature of below about 60° C., and preferably below about 30° C., is desirable. The peroxide should be added to the slurry slowly, i.e. over a period of between about 12 hours and about 96 hours or more. If a highly concentrated solution of peroxide is used it should be added extremely slowly, in order to prevent excessive yield losses and possible oxidation of the catalyst. Dilutue solutions can be added more rapidly.

The catalyst should be present in an amount of at least about 0.5% ferrous ions, based on the weight of the starch. Concentrations of about 2 or 3% are preferred; larger amounts can be used, but are unnecessary.

After the reaction has been completed the catalyst is removed, as by filtration or centrifugation, and the starch derivative recovered from the slurry. The derivatives contain both carboxyl and carbonyl groups in approximately equal proportions, there being generally slightly fewer carbonyl groups than carboxyl.

The starches used in practicing the invention may be derived from any vegetable source, such as, for example, corn, wheat, potato, tapioca, rice, sago, and grain sorghum. High amylose starches, waxy starches, and individual starch fractions (i.e. amylose and amylopectin) may also be used. The term "starch" is used broadly herein and encompasses unmodified starch and tailings, as well as starch that has been modified by treatment with acids, alkalis, enzymes, etc. Starch derivatives of varying types are also suitable in the process. If a starch derivative which contains an oxidizable side chain is treated in accordance with the invention, the side chain is oxidized preferentially, i.e. before the hydroxyl groups on the basic starch molecule. Many interesting and useful derivatives can be produced by appropriate selection of one or more derivatives as starting materials in the process of the invention.

In the following examples, which are presented solely for illustrative purposes and which should not be construed as limiting the scope of the invention, the following analytical procedures were employed in determining the amount of carboxyl and carbonyl functions present in the starch products.

CARBOXYL GROUP DETERMINATION

About 2 to 5 grams of starch is weighed accurately and washed with 20 cc. of 0.1 N HCl, and the mixture is centrifuged. The centrifuge cake is then washed with water until the pH of the supernatant liquid is 4, after which the mixture is centrifuged. The starch is then slurried in water, and 10 cc. of 0.1 N NaOH is added. Phenolphthalein is added to the resulting paste, and the mixture is titrated with 0.1 N HCl. The carboxyl function, in terms of moles/100 grams of starch, is calculated as follows. Let $P$=the weight of dry starch, and $a$=the amount of 0.1 N HCl titrated against the slurry, to which 10 cc. of 0.1 N NaOH had been added. Then, the number of moles of carboxyl function in sample P is $$\frac{(10-a)0.1}{1000}$$

The number of moles of carboxyl function per 100 grams of starch is then calculated as follows:

$$\frac{(10-a)0.1 \times 100}{1000P} = \frac{10-a}{100P} = \text{moles}/100 \text{ gm. starch}$$

CARBONYL GROUP DETERMINATION

To 5 gm. of starch is added 25 cc. of 0.5 N hydroxylamine chlorohydrate, and the pH is adjusted to 5 with NaOH. The mixture is permitted to stand for 20 hours at 20°–25° C., after which the starch is washed with demineralized water and centrifuged four times. The starch is then transferred to a Kjeldahl flask and the excess moisture is evaporated by drying at 90° C.–100° C. A Kjeldahl determination is then performed as follows. 10 gms. of catalyst (10 parts $K_2SO_4$ and 3 parts $CuS_2O_3$) and 50 cc. of concentrated $H_2SO_4$ is added, and the mixture is heated until the solution becomes clear. Zinc, phenolphthalein, and an excess of NaOH are added, and the mixture is distilled into 20 cc. of 0.1 N $H_2SO_4$. The distillate is then titrated with 0.1 N NaOH. The carbonyl function is calculated in the following manner. Letting $a$=the amount of 0.1 N NaOH used in the titration, the number of moles of both carboxyl and carbonyl function in the 5 gm. of starch is represented by $$\frac{(20-a)0.1}{1000}$$

The number of moles of carboxyl and carbonyl function in 100 gms. of starch is calculated as follows:

$$\frac{(20-a)0.1 \times 100}{5 \times 1000} = \text{moles COOH+CO}/100 \text{ gms.}$$

The number of moles of carbonyl function are obtained by subtracting, from the value obtained, the number of moles of carboxyl function previously determined.

Example I

A sulfonated polystyrene resin was first put in the hydrogen form by regeneration with a 10% HCl solution, after which it was washed. A 1% ferrous sulfate solution, prepared with boiled water, was passed over the resin until the resin was completely saturated with ferrous ions.

A 23 Baumé slurry of high amylose corn starch was prepared, and the catalyst was added to the slurry in an amount equivalent to 1% as ferrous ions based on the weight of the starch. 650 cc. of 20 volume hydrogen peroxide per kilogram of starch, dry basis, was then added slowly, over a period of 48 hours, while maintaining the reaction mixture at below 30° C. throughout the entire reaction.

Two more identical runs were then performed, in which the amount of catalyst was raised to 2% and 3% respectively.

After each run the catalyst was removed and the starch product recovered and analyzed. The results are tabulated in Table I.

TABLE I

| Amount of catalyst | 1% | 2% | 3% |
|---|---|---|---|
| Carboxyl groups: | | | |
| Moles/100 gr. starch | 0.021 | 0.021 | 0.021 |
| Substitution per dextrose unit | 1 group every 29 dextrose units. | 1 group every 29 dextrose units. | 1 group every 23 dextrose units. |
| Carbonyl groups: | | | |
| Moles/100 gr. starch | 0.018 | 0.018 | 0.019 |
| Substitution per dextrose unit | 1 group every 34 dextrose units. | 1 group every 34 dextrose units. | 1 group every 32 dextrose units. |
| D.E. | 3.3 | 2.5 | 3.0 |
| Reducing power ($K_3Fe(CM)_6$) | 24.4 | 23 | 25. |
| Yield losses (percent) [1] | 1.2 | 1.2 | 3.5. |

[1] Due to solubilization of the starch.

Example II

Example I was repeated, using 2% catalyst and 100 volume hydrogen peroxide. The resultant derivative contained 0.029 mole carbonyl function/100 gms. starch (1 carbonyl group every 21 dextrose units) and 0.042 mole carboxyl function/100 gms. starch (1 carboxyl group every 15 dextrose units). The D.E. was 5.5, the reducing power 37.3, and the yield loss was 5.5%.

Example III

A series of runs was made, using regular corn starch and 2% catalyst. The remaining reaction conditions were identical to those of Example I.

The derivatives showed carbonyl substitutions of from 0.023 to 0.032 mole/100 gms. starch (1 carbonyl group every 26 to 19 dextrose units) and carboxyl substitution of from 0.021 to 0.029 mole/100 gms. starch (1 group every 29 to 21 dextrose units). The yield losses varied from 4.4% to 8.8%.

Other runs were then made, in which the catalysts were prepared using ferrous chloride and ferrous nitrate as the sources of ferrous ions. The results were comparable to those obtained with ferrous sulfate.

Example IV

Example I was repeated, using waxy maize starch and 2% catalyst. The derivatives contained 0.026 mole carbonyl group per 100 grams of starch and 0.026 mole carboxyl group per 100 grams of starch. The yield loss was 11.3%.

Example V

This example was performed to determine the optimum amount of peroxide addition to the starch.

50 kg. of regular corn starch was suspended in 120 liters of water, and a catalyst prepared as in Example I, in a concentration of 0.5% ferrous ions based on the weight of the starch, was added. While maintaining the temperature at 15° C., a total of 33 liters of 100 volume hydrogen peroxide was added in six approximately equal portions, each portion being added slowly over a period of 24 hours.

At the end of each addition a 1000 gm. sample was removed, washed and analyzed for gel point, Brabender peak viscosity, carbonyl function, carboxyl function, and yield loss due to solubilization. An additional sample was removed and analyzed 24 hours after the final peroxide addition. The results are tabulated in Table II.

TABLE II

| Sample Number | 1 | 2 | 3 | 4 | 5 | 6 | 7 |
|---|---|---|---|---|---|---|---|
| $H_2O_2$ added: | | | | | | | |
| Liters | 5.5 | 11.0 | 16.5 | 22.0 | 27.5 | 33.0 | 33.0 |
| Percent based on starch | 16.5 | 33.0 | 49.5 | 66.4 | 83.0 | 100.0 | 100.0 |
| Gel Point (° C.) | 76 | 74 | 70 | 69 | 67 | 65 | 65 |
| Brabender peak viscosity | 50 | 560 | 410 | 1,300 | 2,020 | 900 | 1,660 |
| Carbonyl groups (moles/100 gm. starch) | .007 | .006 | .008 | .009 | .013 | .007 | .009 |
| Carboxyl groups (moles/100 gm. starch) | .010 | .015 | .012 | .017 | .016 | .016 | .016 |
| Yield loss (5) | 1.5 | 2.6 | 3.2 | 4.8 | 10.0 | 11.3 | 12.3 |

From the data it will be noted that the carbonyl and carboxyl substitutions were relatively low, which could be readily explained by the fact that the concentration of catalyst was only 0.5%. From this it was concluded that a catalyst concentration of much below this value would be undesirable.

It is also apparent from the data that no significant increases in derivatization occur when 50% or more of the stoichiometric amount of peroxide is used, while substantial solubilization and thinning of the starch takes place at amounts above 50%.

Example VI

In this example, the conditions were similar to those of Example V, except the catalyst was added at a level of 2%, and 15 liters of 100 volume hydrogen peroxide (approximately 50% the stoichiometric amount) was added in three 5-liter portions, each portion being added slowly over a period of 24 hours. The results are tabulated in Table III.

TABLE III

| Sample number | 1 | 2 | 3 |
|---|---|---|---|
| $H_2O_2$ added, liters | 5 | 10 | 15 |
| Carbonyl groups, moles/100 gm. starch | .008 | .001 | .016 |
| Carboxyl groups, moles/100 gm. starch | .005 | .01 | .016 |
| Yield losses, percent | 1.6 | 3.3 | 6.1 |

Example VII

This experiment was conducted to determine what effect, if any, pH has in the reaction. Three trials were run, the pH's being maintained at 1.5, 2.5 and 3.0 respectively, by addition of 1 N NaOH during the reactions to neutralize the acid formed. In each run, 2000 gms. of corn starch was suspended in 2000 cc. water, and the catalyst was added in a concentration of 2%. The temperature was maintained at about 15° C. A total of 1300 cc. of 100 volume hydrogen peroxide was added to each starch slurry in 2 equal portions, each portion being added slowly, over a period of 24 hours. After each peroxide addition a sample was tested for carbonyl and carboxyl functions, yield loss, and Brabender viscosity. The results are tabulated in Table IV.

TABLE IV

| Sample Number | 1 | 1a | 2 | 2a | 3 | 3a |
|---|---|---|---|---|---|---|
| $H_2O_2$ added, cc | 650 | 1,300 | 650 | 1,300 | 650 | 1,300 |
| pH | 1.5 | 1.5 | 2.5 | 2.5 | 3.0 | 3.0 |
| Carbonyl groups | .013 | .01 | .005 | .006 | .007 | .008 |
| Carboxyl groups | .006 | .01 | .002 | .013 | .005 | .01 |
| Yield loss (percent) | 2.6 | 4.3 | 1.6 | 3.7 | 1.9 | 3.9 |
| Brabender viscosity (starch concen.) | 120 (6%) | 290 (12%) | 1,050 (8%) | 1,490 (12%) | 4,500 (8%) | 720 (12%) |

As can be seen from the data, pH has relatively little effect upon soluble formation. As would be expected, the viscosity is lower when lower pH's are used.

Example VIII

This experiment was run to determine the effect of the use of substantially high levels of catalyst. Two trials were run, at a temperature of 15° C. and a pH of 2.5, employing 2000 gm. of corn starch slurried in 2000 cc. water. To one slurry was added a catalyst prepared in accordance with Example I in a concentration of 5%, based on the weight of the starch; to the other slurry the catalyst was added in a concentration of 20%. 650 cc. of 100 volume hydrogen peroxide was added slowly to each slurry in two equal portions. The results are tabulated in Table V.

TABLE V

| Sample Number | 1 | 1a | 2 | 2a |
|---|---|---|---|---|
| Catalyst (percent Fe based on wt. of starch) | 5 | 5 | 20 | 20 |
| $H_2O_2$ added (cc.) | 325 | 650 | 325 | 650 |
| Carbonyl groups | .005 | .013 | .005 | .008 |
| Carboxyl groups | .002 | .012 | .004 | .009 |
| Yield loss (percent) | 1.6 | 3.7 | 3.0 | 4.0 |
| Brabender viscosity (starch concen.) | 1,040 (8%) | 1,490 (12%) | 3,900 (8%) | 1,505 (12%) |

It can readily be seen from the data that increasing the catalyst to a high level (20%) has no substantial effect upon the end products obtained.

While the invention has been described in connection with specific embodiments thereof, it will be understood that it is capable of further modification, and this application is intended to cover any variations, uses, or adaptations of the invention following, in general, the principles

I claim:

1. A process for preparing starch derivatives containing both carbonyl and carboxyl groups comprising subjecting starch to the oxidizing action of hydrogen peroxide in the presence of a catalyst comprising stabilized ferrous ions fixed on an oxidation resistant strongly acidic cation exchange resin, while maintaining the temperature at not above about 60° C. throughout the reaction of the hydrogen peroxide with the starch.

2. The process in accordance with claim 1 wherein said catalyst comprises a sulfonated polystyrene cation exchange resin saturated with ferrous ions.

3. The process in accordance with claim 1 wherein said catalyst is present in an amount of at least 0.5% ferrous ions, by weight, based on the weight of the starch.

4. The process in accordance with claim 1 wherein said hydrogen peroxide is present in an amount of at least about 5% by weight, based on the weight of the starch.

5. The process in accordance with claim 1 wherein said catalyst is first mixed with an aqueous slurry of said starch, after which said hydrogen peroxide is added to the mixture over a period of from about 12 to about 96 hours.

6. The process in accordance with claim 1 wherein the temperature is maintained at not above about 30° C. throughout the reaction of the hydrogen peroxide with the starch.

References Cited

UNITED STATES PATENTS 3,450,692    6/1969    Hyldon et al. _____ 260—233.3

DONALD E. CZAJA, Primary Examiner

M. I. MARQUIS, Assistant Examiner

U.S. Cl. X.R.

117—139.5 C, 156 R; 260—2.2 R, 233.5 R